United States Patent
Kaibach et al.

(10) Patent No.: US 6,238,128 B1
(45) Date of Patent: May 29, 2001

(54) DOWEL

(75) Inventors: Werner Kaibach, Buchloe; Stefan Raber, Kaufering; Hans-Jürgen Negele, Denklingen; Alois Kölbl, Buchloe; Ulrich Genschmer, Hofstetten, all of (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/299,238

(22) Filed: Apr. 23, 1999

(30) Foreign Application Priority Data

May 2, 1998 (DE) .............................. 198 19 724

(51) Int. Cl.$^7$ .................................................. F16B 13/06
(52) U.S. Cl. ..................... 403/297; 403/314; 403/374.4; 411/55; 411/60.1; 52/705
(58) Field of Search ...................................... 403/292, 297, 403/309, 310, 312, 314, 369, 370, 366, 374.4; 52/705, 711; 411/55, 60.2, 60.1, 60.3, 69, 70

(56) References Cited

U.S. PATENT DOCUMENTS

| 1,053,682 | * | 2/1913 | Van Antwerp | ........................... | 52/705 |
| 4,966,511 | * | 10/1990 | Lee | ........................................ | 411/55 |
| 4,968,200 | * | 11/1990 | Mark | ..................................... | 411/55 |
| 5,023,990 | * | 6/1991 | Lee, II et al. | ....................... | 411/55 X |
| 5,263,803 | * | 11/1993 | Anquetin | ............................. | 411/55 X |
| 5,816,759 | * | 10/1998 | Ernst et al. | ......................... | 411/55 X |
| 5,816,760 | * | 10/1998 | Mattner et al. | ..................... | 411/55 X |
| 6,027,292 | * | 2/2000 | Raber | ................................... | 411/60.1 |

FOREIGN PATENT DOCUMENTS

| 720129 | * | 4/1942 | (DE) | ......................................... | 411/55 |
| 2521655 | * | 8/1983 | (FR) | ..................................... | 411/60.1 |
| 384103 | * | 8/1983 | (EP) | ........................................... | 411/5 |
| 2109886 | * | 6/1986 | (GB) | ................................... | 411/60.1 |

* cited by examiner

Primary Examiner—Lynne H. Browne
Assistant Examiner—David E. Bochna
(74) Attorney, Agent, or Firm—Brown & Wood, LLP

(57) ABSTRACT

A dowel including an anchor rod (2) provided at front, in a setting direction, end with a head portion (4) widening in the setting direction, and a sleeve (5) having a through-bore and axially displaceable along the anchor rod, with the sleeve (5) having, at its end adjacent to the head portion (4) an expansion region (6) formed by a plurality of expansion tabs (7) separated from each other by substantially axially extending slots (8) and radially expandable upon a relative displacement of the sleeve (5) and the anchor rod (2), and a sleeve section adjoining the expansion region (6) and having, in its rear end region (10), a larger diameter (G) than in its front end region (12) adjoining the expansion region (6), with the sleeve section having a narrowing intermediate region (11) extending between the rear end region (10) and the front end region (12) and having a smallest outer diameter (M) which is smaller than an outer diameter (F) in the front end region (12).

16 Claims, 1 Drawing Sheet

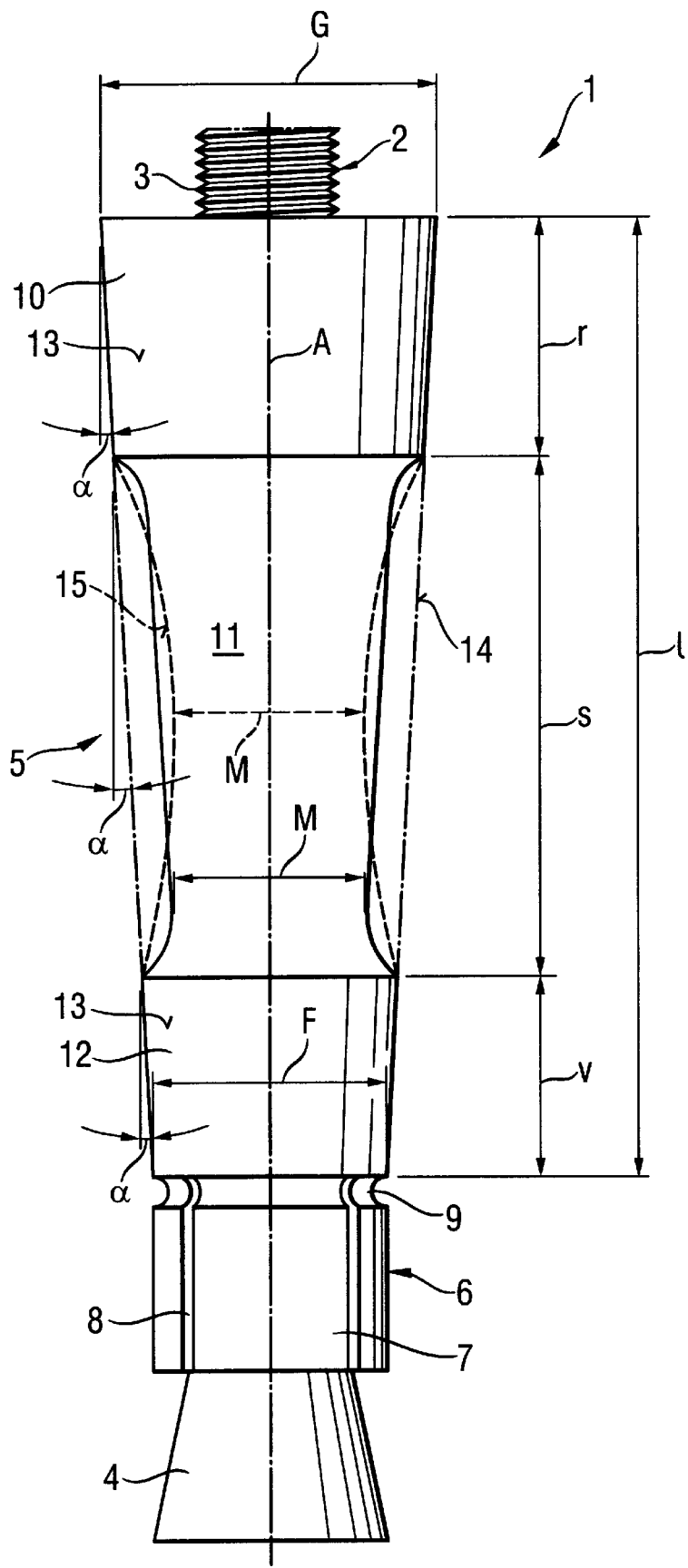

DOWEL

BACKGROUND OF THE INVENTION

1. Field of the Invention

The present invention relates to a dowel including an anchor rod provided at its front, in a setting direction, end with a head portion widening in the setting direction, and a sleeve having a through-bore and axially displaceable along the anchor rod, with the sleeve having, at its end adjacent to the head portion an expansion region formed of a plurality of expansion tabs separated from each other by substantially axially extending slots and radially expandable upon a relative displacement of the sleeve and the anchor rod.

2. Description of the Prior Art

With the dowels of a type described above, the anchoring principle is based essentially on a forcelocking connection of an outer surface of the expansion region of the sleeve with the wall of a bore into which the dowel is inserted. This principle is well known and is widely used in conventional expansion anchors. In another type of the dowel described above, the anchoring is based on a formlocking principle, when radially expandable expansion tabs, which form the expansion region of the sleeve, form a formlocking connection with an undercut formed in the bottom region of a bore, into which the dowel is inserted, by cutting elements provided at free ends of the expansion tabs upon the radial expansion of the tabs. Such dowels are known as undercut self-cutting dowels or expansion anchors. Both types of dowels include an anchor rod with a head portion widening in a setting direction, and load application means provided at the rear end, mostly in form of an external thread. The dowel further includes a sleeve mounted on the anchor rod and axially displaceable therealong. The sleeve has an expansion region adjacent to the head portion, with the expansion region being formed, as it has already been mentioned above, by expansion tabs separated by a longitudinally extending slots. Upon displacement of the sleeve over the mostly cone-shaped head portion widening outwardly, the expansion tabs expand radially and provide for anchoring of the dowel in a bore, by forming a force- and/or formlocking connection with the bore wall.

The anchor rod of the known dowel is usually surrounded by the sleeve over a substantial part of its longitudinal extent in the bore. The purpose of the sleeve is not only provide for a radial expansion of the expansion region of the sleeve and for anchoring of the dowel upon its displacement relative to the anchor rod. The sleeve should also transmit the transverse forces, which are generated upon the static and dynamic loading of the dowel, in a direction toward the bore wall. Also known are dowels or expansion anchors in which the expansion region is provided on a relatively short front sleeve which is adjoined by a second sleeve extending up to the bore opening. The second sleeve serves for transmitting transverse forces, which are generated upon the static and dynamic loading of the dowel, to the bore wall.

Bores often have, upon being drilled, a shape that deviates from a theoretical cylindrical shape. In most cases, the bore has a slightly conical shape with the diameter of the bore being larger at the bore opening than at the bore bottom. When bores are formed in concrete, in particular, in a concrete with hard additive, e.g., in french or british flint concrete, there is a danger that a drill, upon striking a hard lump, would temporarily deviate from its line of symmetry. As a result, a bore could be formed which, in addition to a clonicity, would have an arcuate contour. The sleeves of the conventional expansion anchors and of the undercut self-cutting dowels and anchors lie non-uniformly on the walls of such bores. With a cylindrical outer contour of the sleeve, the outer diameter of the sleeve should correspond to the diameter of the bore in its deepest point because otherwise difficulties can arise upon setting of the dowel into a bore. Therefore, the sleeve has a clearance with respect to the bore wall along a substantial portion of its longitudinal extent in the bore. As a result, the sleeve does not adequately lie on the bore wall. This adversely affects transmission of the transverse forces, which are generated upon loading of the dowel, to the bore wall, and negatively act on the dynamic suitability of the dowel. An arcuate contour of the bore can result in increase of the drive-in forces during setting of the dowel. With undercut self-cutting dowels or anchors, which are driven-in with a rotatable sleeve in order to form an undercut in the bore wall upon the radial expansion of the expansion tabs, an increased friction losses can occur between the sleeve wall and the bore wall. The resulting increase in drive-in forces negatively influences the setting speed and can lead, in some cases, to a non-complete anchoring of the dowel.

Accordingly, an object of the present invention is a dowel of a type described above in which the drawbacks of conventional dowels are eliminated.

Another object of the present invention is a dowel having a high dynamic suitability.

A further object of the present invention is a dowel having low friction losses and requiring small drive-in forces for its setting in a bore.

A still further object of the present invention is a dowel which can be anchored in a bore easily, quickly, and reliably.

SUMMARY OF THE INVENTION

These and other objects of the present invention, which will become apparent hereinafter, are achieved by providing a dowel including an anchor rod providing at its front, in a setting direction, end with a head portion widening in the setting direction, and a sleeve having a through-bore and axially displaceable along the anchor rod, with the sleeve having, at its end adjacent to the head portion an expansion region formed by a plurality of expansion tabs separated from each other by substantially axially extending slots and radially expandable upon a relative displacement of the sleeve and the anchor rod. A sleeve section, which adjoining the expansion region, has, in its rear end region, a larger diameter than in its front end region which adjoins the expansion region. Between the rear end region and the front end region, there is provided a narrowing intermediate region the smallest outer diameter of which is smaller than the diameter of the sleeve section in its front region.

The dowel according to the present invention has sleeve section having a larger outer diameter in its rear region than in its front region. As a result, the outer contour of the sleeve section in its front and rear regions better corresponds to a real profile of a conventional bore which has, as it has already been mentioned above, a larger diameter in its opening region than in its bottom region. With such a sleeve section, the sleeve better abuts the bore wall in its rear region. The clearance between the sleeve and the bore wall is reduced. As a result, the sleeve better transmits the transverse forces, which are generated upon loading of the dowel, to the bore wall. The dowel has an increased dynamic suitability. Because of the sleeve tapering middle region, the small curved portion of the bore contour are better compensated. During a setting process, only the front and rear regions of the sleeve section abut the bore wall. This reduces friction between the sleeve outer wall and the bore wall, which favorably influences the necessary drive-in forces during a percussion and/or rotary driving of the sleeve in. Thereby, the dowel is anchored in a constructional component more easily and quickly. The danger of an incomplete expansion of the expansion region of the sleeve, which can result if insufficiently high setting forces are applied, is reduced. The sleeve section can be formed as an integral portion of a sleeve having an expansion region and be formed with the expansion region as one piece. The sleeve section can also be formed as a separate sleeve which is mounted on the anchor rod after the sleeve with an expansion region has been mounted.

A particularly good matching of the sleeve with a conventional slightly conical bore is achieved when the sleeve section has a largest outer diameter in its rear end region, and the ratio between the largest outer diameter of the sleeve section and the smallest outer diameter of the front end region of the sleeve section is within the following range $1<G/F<1.3$, where G is the largest outer diameter of the sleeve section, and F is the smallest outer diameter of the front end section. A preferred ratio between the largest outer diameter of the sleeve section and the smallest outer diameter of the front end region of the sleeve section is selected within the following range $1<G/F<1.1$.

In an advantageous embodiment of the present invention, the ratio of the smallest outer diameter of the front region of the sleeve section to the smallest outer diameter of the intermediate section is $1<F/M<1.5$, preferably $1<F/M<1.3$, where M is the smallest outer diameter of the intermediate region of the sleeve section. This insures that the intermediate or middle region of the sleeve section does not contact the arcuate portion of the bore wall, and permits to keep the friction losses between the outer surface of the sleeve section and the bore wall, during the setting of the dowel, low. For a dynamic stability of the inventive dowel, it is advantageous when the sleeve section has a total length selected according to the expression $2G \leq 1 \leq 16G$, preferably, $3G \leq 1 \leq 10G$, where 1 is the total length of the sleeve section, and G is the largest diameter of the sleeve section.

For an adequate transmission of the transfer forces to the constructional component, in which the dowel is set in, it is advantageous when the sleeve section abuts the bore wall as flatly as possible. To this end, it is of advantage, when the axial length of the rear region of the sleeve section is selected according to an expression $0.25G \leq r \leq 10G$, preferably, $0.5G \leq r \leq 6G$, where r is the length of the rear region. It is further advantageous when the rear region has a shape of a truncated cone tapering in the setting direction.

To provide for as flat as possible contact of the front region of the sleeve section with the bore wall, the axial length (v) of the front region is selected according to the expression $0.25G \leq v \leq 6G$, preferably, $0.5G \leq v \leq 4G$. Preferably, the front region likewise has a shape of a truncated cone tapering in a setting direction.

For a flat contact of the truncated cone-shaped rear and front region of the sleeve section with the bore wall, it is advantageous when the outer surfaces of the front and rear regions form each with the axis of the sleeve section an angle from about 0.1° to about 3.3°, preferably, an angle amounting to from 0.2° to 0.9°.

In an optimal embodiment of the inventive dowel, the outer surface of the front region of the sleeve section forms a linear extension of the outer surface of the rear region. In this way, a fictitious envelope outer surface is provided which extends from the largest diameter of the rear region to the smallest diameter of the front region, which has a shape of a truncated cone, and which form with the sleeve section axis an angle from about 0.1° about 3.3°, preferably, between 0.2° and 0.9°.

According to another embodiment of the inventive dowel, the intermediate region of the sleeve has an outer contour narrowing conically in a setting direction. In this way, the sleeve section is formed of three conical sections. In this case, the outer diameter of the sleeve section is discretely changed upon transition from one sleeve section region to a following, in the setting direction, region.

In an alternative embodiment of the inventive dowel, the intermediate region has a concave outer contour. In this case, the outer diameter is smoothly changed upon transition from one region to another region. It gradually decreases in both conical end regions. In the intermediate region, the diameter gradually decreases from the smallest diameter of the rear region to that point of the intermediate region where it has the smallest diameter. From that point, the sleeve section diameter again increases until it reaches the largest diameter of the front end region. The largest diameter of the front end region is smaller than the smallest diameter of the rear end region. In this way the intermediate region is provided with a conical shape that is superimposed over a curved, waist-like outer contour.

BRIEF DESCRIPTION OF THE DRAWINGS

The features and objects of the present invention will become more apparent, and the invention itself will be the best understood from the following detailed description for the preferred embodiment when read with reference to the accompanying drawings, wherein:

Single FIGURE shows a schematic side elevational view of a dowel according to the present invention.

DETAILED DESCRIPTION OF THE PREFERRED EMBODIMENT

A dowel 1 according to the present invention includes an anchor rod 2 provided at its rear end with an outer thread 3 which serves as load application means. At the opposite, front end, the anchor rod 2 is provided with a head portion 4 which expands substantially conically in the setting direction. A sleeve 5 is mounted on the anchor rod 2 for an axial displacement therealong. The sleeve 5 has an expansion region 6 at its end adjacent to the head portion 4 of the anchor rod 2. The expansion region 6 is formed by expansion tabs 7 which are separated from each other by substantially axially extending slots 8 and extend from a flexible hinge 9 toward the front end of the sleeve 5. The expansion tabs 7 expand radially upon the displacement of the sleeve 5 axially over the head portion 4. A dowel according to the present invention is an undercut self-cutting dowel which automatically forms an undercut in a bottom region of a bore, into which the dowel is inserted, upon the expansion region 6 of the sleeve 5 being rotary-percussion driven over the head portion 4 of the anchor rod 2.

A section of the sleeve 5, which tapers from a rear end region 10 toward a front end region 12 adjoining the expansion region 6, adjoins the expansion region 6. A section of the sleeve 5, which extends between the front end region 12 and the rear end region 10, forms an intermediate region 11 of the sleeve 5. The section of the sleeve 5, which adjoins the expansion region 6 and is formed of the end region 10, the intermediate region 11, and the front end region 12, has a total length l, which axial length l being selected in with an expression $2G \leq l \leq 16G$, preferably, $3G \leq l \leq 10G$, where G is the largest outer diameter of the sleeve section, which adjoins the expansion region 6, in the rear end region 10. The diameter G substantially corresponds to a diameter of a drill with which a bore, into which the dowel is to be set, is formed. The intermediate region 11 has a smallest diameter M which is smaller than the smallest outer diameter F of the front region 12. For a better clarity, the conicity and the minimum diameters of the sleeve section above the expansion region 6 are shown more sharply than they really are. A ratio of the largest outer diameter G of the rear end region 10 and of the smallest outer diameter F of the front end region is $1<G/F<1.3$, preferably $1<G/F<1.1$. The ratio of the smallest outer diameter F of the front end region 12 and of the smallest outer diameter M of the intermediate region 11 is $1<F/M<1.5$, preferably, $1<F/M<1.3$.

The rear end region 10 has an axial length r selected in accordance with an expression $0.25G \leq r \leq 10G$, preferably, $0.5G \leq r \leq 6G$. The rear end region 6 has an outer contour tapering the setting direction, forming a truncated cone. Preferably, the outer surface 13 of the rear end region 10 forms with the axis A of the sleeve 5 an angle α which amounts to from about 0.1° to about 3.3°, preferably, from 0.2° to 0.9°. The front end region 12 has an axial length v, with $0.25G \leq v \leq 6G$, preferably, $0.5 \leq v \leq 4G$. The outer contour of the front end region 12 tapers in the setting direction preferably so that its outer surface $13^1$ forms with the axis A of the sleeve 5 the same angle α as the angle which the outer surface 13 of the rear end region 10 forms with the axis A, i.e., the angle α from about 0.1° to about 3.3°, preferably, from about 0.2° to about 0.9°. The conicities of the rear end region 10 and the front end region 12 are advantageously so selected that the outer surface $13^1$ of the front end region 12 forms an extension of the outer surface 13 of the rear end region 10. As a result, a fictitious envelope outer surface 14 of the intermediate region 11 likewise forms with the axis A the angle α from about 0.1° to about 3.3°, preferably, from 0.2° to 0.9°.

The intermediate region 11 has an axial length s equal to a difference between the total length l of the sleeve section adjoining the expansion region 6 and the length r and v of the end sections 10 and 12. The outer contour of the intermediate region 11 can be formed in two ways, as shown in the drawing. A contour shown with continuous lines has a shape of a truncated cone. The inclination angle of the outer surface of the intermediate region 11 can correspond to the inclination angle α of the outer surfaces 13 and $13^1$ of the rear and front end regions 10 and 12. The smallest outer diameter M of the intermediate region 11 is provided, with this modification, in the immediate vicinity of the front end region 12. A second modification is shown in the drawing with dash lines. With this modification, the outer diameters in the transition regions between the rear end region 10, the intermediate region 11, and the front end region 12 are not reduced discretely. The outer diameter of the intermediate region diminishes from a smaller diameter of the transition region between the intermediate region 11 and the rear end region 10 to the smallest diameter M of the intermediate region 11. Then, the outer diameter of the intermediate region 11 again increases from the smallest diameter M to a largest diameter of the transition region between the intermediate region 11 and the front end region 12. It should be noted that the larger diameter of the front end region 12 is smaller than the smaller diameter of the rear end region 10. The intermediate region 11 has a conical shape which overlies the curved waist-like outer contour 15. The conical waist-like outer contour 15 need not necessarily have an arcuate profile. It can, e.g., be formed of several truncated cone sections arranged one after another adjacent to each other.

As discussed above, the dowel according to the present invention is formed as an undercut self-cutting dowel and has a one-piece sleeve. Clearly, the sleeve can be formed as a two-part member formed of a front sleeve with an expansion region and a second sleeve adjoining the front sleeve. The dowel according to the present invention need not necessarily be formed as an undercut self-cutting dowel. A sleeve having a conical, waist-like geometry can also be used with expansion anchors.

Though the present invention was shown and described with references to the preferred embodiments, various modifications thereof will be apparent to those skilled in the art and, therefore, it is not intended that the invention be limited to the disclosed embodiment or details thereof, and departure can be made therefrom within the spirit and scope of the appended claims.

What is claimed is:

1. A dowel, comprising an anchor rod (2) provided at a front, in a setting direction, end thereof with a head portion (4) widening in the setting direction; and a sleeve (5) having a through-bore and axially displaceable along the anchor rod, the sleeve (5) having, at and end thereof adjacent to the head portion (4) an expansion region (6) formed by a plurality of expansion tabs (7) separated from each other by substantially axially extending slots (8) and radially expandable upon a relative displacement of the sleeve (5) and the anchor rod (2), and a sleeve section adjoining the expansion region (6) and having, in a rear and region (10) thereof, a larger diameter (G) than in a front end region (12) thereof adjoining the expansion region (6), the sleeve section having a narrowing intermediate region (11) extending between the rear end region (10) and the front end region (12) and having a smallest outer diameter (M) which is smaller than an outer diameter (F) in the front end region (12), wherein the sleeve section has a largest outer diameter (G) in the rear end region (10) thereof, and the outer diameter (F) in the front end region (12) is a smallest diameter of the front end region (12) of the sleeve section, and wherein a ratio between the largest outer diameter (G) of the rear end region (10) and the smallest outer diameter (F) of the front end region (12) is $1<G/F<1.3$.

2. A dowel according to claim 1, wherein the ratio between the largest diameter (G) of the rear end region (10) and the smallest outer diameter (F) of the front end region (12) is $1<G/F<1.1$.

3. A dowel according to claim 1, wherein the outer diameter (F) in the front end region (12) is a smallest outer diameter of the front end region (12), and wherein a ratio between the smallest outer diameter (F) of the front end region (12) and the smallest outer diameter (M) of the intermediate region (11) is $1<F/M<1.5$.

4. A dowel according to claim 3, wherein the ratio between the smallest outer diameter (F) of the front end region (12) and the smallest outer diameter (M) of the intermediate region (11) is $1<F/M<1.3$.

5. A dowel according to claim 1, wherein the sleeve section adjoining the expansion region (6) has a total axial length (1) which amounts to 2G≦1≦16G, wherein G is the largest diameter of the sleeve section.

6. A dowel according to claim 5, wherein the total length (1) of the sleeve section amounts to 3G≦1≦10G.

7. A dowel according to claim 1, wherein the rear end region (10) has an axial length (r) which amounts to 0.25G≦r≦10G, G being the largest diameter of the rear end region, and wherein the rear end region (10) has, a narrowing in the setting direction, truncated cone shape.

8. A dowel according to claim 7, wherein the axial length (r) of the rear end region (10) amounts to 0.5G≦1≦16G.

9. A dowel according to claim 1, wherein the front end region (12) has an axial length (v) which amounts to 0.25G≦r≦6G, G being the largest diameter of the rear end region, and wherein the front end region (12) has a narrowing in the setting direction, truncated cone shape.

10. A dowel according to claim 9, wherein the axial length (v) of the front end region (12) amounts to 0.5G≦v≦4G.

11. A dowel according to claim 1, wherein the rear end region (10) and the front end region (12) each has an outer surface (13, 13$^1$) which forms with an axis (A) of the sleeve section an angle (α) from about 0.1° to about 3.3°.

12. A dowel according to claim 11, wherein the angle (α) between the outer surface (13, 13$^1$) and the axis (A) of the sleeve section amounts to from about 0.2° to about 0.9°.

13. A dowel according to claim 11, wherein the sleeve section has an envelope surface (14) extending from the largest diameter (G) of the rear end region (10) to the smallest diameter (F) of the front end region (12), having a shape of a truncated cone, and forming with the axis (A) of the sleeve section an angle (α) from about 0.1° to about 3.3°.

14. A dowel according to claim 13, wherein the angle (α) between the envelope surface (14) and the axis (A) of the sleeve section amounts to from about 0.2° to about 0.9°.

15. A dowel according to claim 1, wherein the intermediate region (11) has an outer contour conically narrowing in the setting direction.

16. A dowel according to claim 1, wherein the intermediate region (11) has a concave outer contour (15).

* * * * *